US009556824B2

(12) United States Patent
Ohrem et al.

(10) Patent No.: US 9,556,824 B2
(45) Date of Patent: Jan. 31, 2017

(54) INTEGRATION OF FORCED EGR/EGR-PUMP INTO EGR-COOLER

(71) Applicant: Halla Visteon Climate Control Corp., Daejeon (KR)

(72) Inventors: Carsten Ohrem, Bergheim (DE); Peter Diehl, Köln (DE)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/667,729

(22) Filed: Mar. 25, 2015

(65) Prior Publication Data

US 2015/0275825 A1 Oct. 1, 2015

(51) Int. Cl.
*F02M 25/07* (2006.01)
*F01N 3/02* (2006.01)

(52) U.S. Cl.
CPC ........ *F02M 25/0726* (2013.01); *F01N 3/0205* (2013.01); *F02M 26/29* (2016.02); *F02M 26/05* (2016.02); *F02M 26/06* (2016.02); *F02M 26/24* (2016.02); *F02M 26/32* (2016.02); *Y02T 10/16* (2013.01)

(58) Field of Classification Search
CPC .............. F01N 3/0205; F02M 25/0726; F02M 25/0734; F02M 25/0707; F02M 25/0709; F02M 25/0732; F02M 25/0737
USPC ........................................ 60/320, 602, 605.2
See application file for complete search history.

(56) References Cited

U.S. PATENT DOCUMENTS

| 2004/0055740 | A1* | 3/2004 | Meshenky | .......... F02B 29/0462 165/125 |
| 2004/0065433 | A1* | 4/2004 | Meshenky | .......... F02B 29/0462 165/153 |
| 2004/0118389 | A1* | 6/2004 | Shaffer | ............... F02B 29/0462 123/563 |
| 2005/0058535 | A1* | 3/2005 | Meshenky | .......... F02B 29/0412 415/121.3 |
| 2007/0214789 | A1* | 9/2007 | Stiermann | ............... F01D 25/14 60/616 |
| 2009/0255251 | A1* | 10/2009 | Paffrath | .................... F02D 9/04 60/602 |
| 2010/0043761 | A1 | 2/2010 | Joergl et al. | |
| 2010/0293943 | A1 | 11/2010 | Teng et al. | |

(Continued)

FOREIGN PATENT DOCUMENTS

DE  102008018583 A1  10/2009
JP  05-071426 A  3/1993

(Continued)

*Primary Examiner* — Nicholas J Weiss
*Assistant Examiner* — Dapinder Singh
(74) *Attorney, Agent, or Firm* — Fraser Clemens Martin & Miller LLC; James D. Miller (57) ABSTRACT

A device for the recycling of exhaust gas of an internal combustion engine in a motor vehicle. The device comprises an exhaust gas heat exchanger constructed with a first housing element with an inlet and an outlet for the exhaust gas and at least one inlet and at least one outlet for a coolant, and a compressor which is constructed with a second housing element with an inlet and an outlet for the exhaust gas. The first housing element of the exhaust gas heat exchanger and the second housing element of the compressor are constructed as a housing connected to a cohesive, compact component so that the exhaust gas heat exchanger and the compressor are arranged inside the housing.

11 Claims, 4 Drawing Sheets

(56) References Cited

U.S. PATENT DOCUMENTS

| 2011/0014028 A1* | 1/2011 | Wood | F01D 25/12 |
| | | | 415/1 |
| 2014/0271258 A1* | 9/2014 | Vezil | F04B 49/22 |
| | | | 417/53 |

FOREIGN PATENT DOCUMENTS

| JP | 11-062715 A | 3/1999 |
| JP | 2000-205024 A | 7/2000 |
| KR | 20110071315 A | 6/2011 |
| KR | 20130040326 A | 4/2013 |

* cited by examiner

INTEGRATION OF FORCED EGR/EGR-PUMP INTO EGR-COOLER

CROSS-REFERENCE TO RELATED APPLICATION

This application claims priority to German Provisional Patent Application Serial No. DE 10 2014 104 093.7 filed on Mar. 25, 2014 and German Non-Provisional Patent application Serial No. DE 10 2015 104 179.0 filed Mar. 20, 2015, hereby incorporated herein by reference in their entirety.

FIELD OF THE INVENTION

The invention relates to a device for the recycling of exhaust gas of an internal combustion engine in a motor vehicle. The device is provided with an exhaust gas heat exchanger and a compressor, wherein the exhaust gas heat exchanger comprises a first housing element and the compressor comprises a second housing element.

BACKGROUND

Systems for the recycling of exhaust gas in motor vehicles are known from the prior art. These systems reduce the nitrogen oxides in the exhaust gases, in particular in the exhaust gases of motor vehicles operated with diesel fuel, and reduce fuel consumption of motor vehicles operated with gasoline. In generic systems of the recycling of exhaust gas, fresh air to the internal combustion engine is mixed with cooled or non-cooled exhaust gas in order to meet the legal guidelines of the regulations for exhaust gas/emission regarding the nitrogen oxides, but also for the emission hydrocarbons, particles and/or carbon dioxide. In the generic systems, exhaust gas is removed from the exhaust-gas stretch outside of the engine and is supplied via the mixing with fresh air to a new combustion.

During combustion under high temperatures polluting nitrogen oxides are produced, in particular when lean mixtures are used, that is, in the partial load range in the internal combustion engine of motor vehicles. In order to reduce the emission of nitrogen oxides, a lowering of the high temperature peaks and a reduction of the excess air during the combustion are necessary. Due to the lower concentration of oxygen in the fuel-air mixture, the speed of the combustion process and the maximal combustion temperatures are reduced. Both effects are achieved by mixing in a partial mass flow of the exhaust gas to the fresh air current taken in by the internal combustion engine.

In the case of motor vehicles operated with diesel fuel, a system for recycling exhaust gas also brings about the reduction of the emission of noise in addition to reducing the amount of oxygen and the temperature peaks during the combustion. In addition, in the case of motor vehicles operated with gasoline with a system for recycling exhaust gas, throttle losses are also reduced.

However, the mixing in of the recycled current of exhaust gas with high temperatures reduces the cooling effect and also the degree of efficiency of the internal combustion engine. In order to counteract these reductions the exhaust gas is cooled off prior to the admixture in a heat exchanger, referred to as an exhaust gas heat exchanger or exhaust gas recycling cooler. In the case of motor vehicles operated with gasoline the additional cooling of the exhaust gas brings about an increase of the compression ratio of the air supplied to the internal combustion engine.

Laws regarding the standards for exhaust gases and requirements for fuel consumption in motor vehicles are becoming increasingly strict, bringing about an increased cooling requirement. Additionally, space for the components in the motor vehicle is becoming smaller and smaller.

Systems for the recycling of exhaust gas with different types of exhaust gas heat exchangers are known from the prior art. In one embodiment, the exhaust gas to be cooled and a coolant, preferably the cooling liquid of the cooling circuit of the internal combustion engine and therefore two media, flow through the traditional exhaust gas heat exchanger. The exhaust gas is conducted in tubes or conduits with different shapes through the exhaust gas heat exchanger. The coolant flows around the tubes or conduits on their outside so that the mass flow of the coolant flows in an intermediate space formed by a housing and the tubes or conduits. The housing surrounds the tubes or conduits and the intermediate space. A distinction is made, between exhaust gas heat exchangers with an I flowthrough, a U flowthrough, or an S flowthrough as a function of the number of the reversals of the direction of flow of the exhaust gas current and of the associated shape of the tubes or conduits.

The structural components conducting the exhaust gas are preferably made of high-grade steel in order to achieve a high resistance to temperature and to corrosion. High-grade steel, aluminum or plastic are used for the housing in contact with the coolant and the environment, depending on the design of the exhaust gas heat exchanger.

Systems for the recycling of exhaust gas that are known from the prior art, and in addition to the exhaust gas heat exchanger, comprise a valve and a bypass for the recycling of non-cooled exhaust gas. The bypass is opened at special operating points of the internal combustion engine, for example, during a cold start, in order to avoid the formation of condensate in the exhaust gas heat exchanger.

In order to conduct exhaust gas from the exhaust gas side to the suction side of the internal combustion engine, a necessary pressure gradient from the exhaust gas side to the suction side is needed. In certain arrangements for removing a part of the exhaust gas or for feeding the exhaust gas into the fresh air on the intake side, or in certain operating modes of the internal combustion engine, the pressure gradient is not sufficient for transferring the mass flow of the exhaust gas, which is the case, in particular, in the design of the system for the recycling of exhaust gas at low pressure. The recycling of exhaust gas at low pressure is after a turbocharger on the exhaust gas side and in front of a turbocharger on the suction side. In addition, in the case of a slight pressure gradient, a reliable dosing of the exhaust gas to be mixed with fresh air can be ensured only with difficulty. In order to ensure the pressure gradient between the exhaust gas side and the suction side of the internal combustion engine, and to ensure mass flow of the exhaust gas, additional compressors for compressing the mass flow of the exhaust gas are used.

DE 10 2008 018 583 A1 discloses an exhaust gas recycling system for an internal combustion engine with an exhaust gas recycling valve arranged in an exhaust gas recycling line. A first exhaust gas cooler is arranged in the exhaust gas recycling line and a turbocooling unit is arranged in the direction of flow of the exhaust gas behind the first exhaust gas cooler in the exhaust gas recycling line. The turbocooling unit is constructed to be circumventable by a bypass conduit and comprises a compressor, a second exhaust gas cooler, and a turbine mechanically coupled to the compressor. The compressor is driven by the power given off by the turbine.

US 2010/0293943 A1 teaches a power plant with an internal combustion engine, in particular a diesel engine, exhaust gas heat exchangers, and a compressor driven by an exhaust gas turbine for making the charging air available. The exhaust gas turbine and the compressor are directly coupled mechanically.

As is known, even electrically driven compressors, in particular radial compressors, are used for making the pressure gradient available between the exhaust gas side and the suction side of the internal combustion engine for transporting the certain mass flow of the exhaust gas. The electrically driven radial compressor comprises a compressor wheel connected by a shaft or a transmission to an electrical motor. The compressor wheel is surrounded by a compressor housing especially constructed for conducting the flow. On account of the special geometry, the compressor housing is preferably manufactured as a cast part of steel or aluminum.

In systems for recycling exhaust gas with an exhaust gas heat exchanger and a compressor, which are known from the prior art, the components are constructed independently and separate from one another. The separate construction has as a consequence an elevated number of structural components, an elevated space requirement, a high weight, and elevated manufacturing and assembly costs as a consequence. In addition, possible positive thermodynamic and engineering interactions between the exhaust gas heat exchanger and the compressor cannot be utilized.

Accordingly, there exists a need in the art for a device available for the recycling of exhaust gas of an internal combustion engine with which the mass flow of the exhaust gas should be cooled and/or compressed before being recycled to the fresh air taken in by the internal combustion engine. The device should have a simple construction consisting of a minimal number of components with a minimal space requirement and a low weight. In addition, the expenses for the manufacture, service and assembly should be minimal.

SUMMARY OF THE INVENTION

The need in the prior art is addressed by the subject matter with the features of the independent claim. Further developments are indicated in the dependent claims.

The need in the prior art is addressed by a device in accordance with the present invention for recycling exhaust gas of an internal combustion engine in a motor vehicle with an exhaust gas heat exchanger and a compressor. The exhaust gas heat exchanger is constructed with a first housing element that comprises an inlet and an outlet for the exhaust gas, and at least one inlet and at least one outlet for a coolant. The compressor comprises a second housing element that is constructed with an inlet and an outlet for the exhaust gas.

According to the conception of the invention, the first housing element of the exhaust gas heat exchanger and the second housing element of the compressor is constructed as a common housing connected to a cohesive, compact component. The exhaust gas heat exchanger and the compressor are arranged inside the common housing.

The first housing element of the exhaust gas heat exchanger and the second housing element of the compressor form a cohesive unit, so that the device for cooling and compression of the exhaust gas is arranged inside a single component. The exhaust gas heat exchanger and the compressor are integrated in one housing.

According to a first alternative embodiment of the invention, the housing of the device is constructed with the first housing element and the second housing element as a one-piece component consisting of one material, in particular of aluminum. The advantageous usage of aluminum as material additionally makes it possible to manufacture the housing in a casting process, wherein expensive constructions, in particular of the housing element of the compressor are integrated.

Additional connection points such a seams or sealing elements to be reworked are avoided with the one-piece construction.

According to a second alternative embodiment of the invention the first housing element and the second housing element of the housing of the device are connected to one another with both having the same substance, positively or non-positively. The two housing elements that were separated from one another prior to assembly are preferably soldered or welded, for example, with a laser method, or screwed, crimped or clipped. The first housing element and/or the second housing element can be in one piece or multipartite, that is, constructed of at least two parts. The individual parts of the housing elements are connected during the assembly of the device to one housing.

The first housing element and the second housing element can have different qualities and can also be constructed as sheets or as cast structural components, wherein even steel or plastic can be used in addition to aluminum as materials.

The housing elements can advantageously be joined together in a soldering procedure as an entire device with heat exchanger and compressor, for example, consisting of a multipartite, wherein the first housing element consists of a sheet and a one-part cast, and the second housing element is formed of steel.

According to a further development of the invention the compressor is arranged in the direction of flow of the exhaust gas after the exhaust gas heat exchanger or, in the case of a multi-fluted construction of the exhaust gas heat exchanger, between two flutes of the exhaust gas heat exchanger.

The exhaust gas heat exchanger is preferably constructed in a single-fluted, two-fluted or multi-fluted manner wherein each flute represents a partial area of the exhaust gas heat exchanger as a flow path. The flow paths of different flutes are flowed through by the exhaust gas successively, that is, in series. The directions of flow of the exhaust gas are advantageously reversed in successive flutes.

According to a preferred embodiment of the invention conduits for conducting the exhaust gas are formed in the area of the exhaust gas heat exchanger. The conduits extend from the inlet of the exhaust gas heat exchanger to the inlet of the compressor. The exhaust gas exiting from the conduits of the exhaust gas heat exchanger is collected in the area of the inlet of the compressor and is directly introduced into the compressor. Consequently, the exhaust gas flows between the housing element of the exhaust gas heat exchanger and the housing element of the compressor advantageously without additional components, such as intermediate elements, and without additional flow paths with possible changes of direction or cross-sectional changes The exhaust gas heat exchanger advantageously comprises tubes forming the conduits, wherein the exhaust gas flows on the inside and the coolant on the outside of the tubes.

According to an alternative embodiment the conduits are formed from a first component and a second component in a bipartite manner. Elements for surface enlargement such as corrugated ribs or ribs with similar geometries are advantageously arranged between both components. The components forming the conduits are arranged stacked above each other. At the end of the conduits, the components widening the conduits are preferably constructed in such a manner that on the one hand an intermediate space for the coolant is produced between the components and on the other hand the intermediate space is sealed against the exhaust gas. The exhaust gas heat exchanger can be constructed, in particular on the coolant side, with a two-stage cooling.

Another advantageous embodiment of the invention consists in that the compressor is constructed as a radial compressor with a compressor wheel. The compressor wheel is arranged inside the second housing element and mechanically coupled via a drive shaft to a drive. The drive shaft extends through a bearing element into the second housing element and is arranged supported in such a manner that it can rotate about an axis of rotation with the bearing element.

According to a further development of the invention a bypass conduit is formed for separating at least a part of the mass flow of the exhaust gas that extends from the inlet of the exhaust gas into the housing to the outlet out of the housing. Therefore, at least a part of the mass flow of the exhaust gas can be conducted around the exhaust gas heat exchanger and the compressor.

According to a preferred embodiment of the invention a bypass conduit is formed for separating at least a part of the mass flow of the exhaust gas that extends from the inlet of the exhaust gas into the housing to the inlet of the compressor.

According to another advantageous embodiment of the invention a bypass conduit is designed for separating at least a part of the mass flow of the exhaust gas that extends from the outlet of the compressor to the outlet of the housing.

Therefore, at least a part of the mass flow of the exhaust gas can be conducted around at least a partial area of the exhaust gas heat exchanger.

The bypass conduits are preferably constructed with a bypass valve for opening and closing the particular bypass conduit so that the amount of the mass flow of the exhaust gas can be adjusted by the associated bypass conduit.

According to another advantageous embodiment of the invention the housing comprises cooling conduits that are connected by fluid engineering to a volume of the exhaust gas heat exchanger that is loaded by coolant. The cooling conduits extend here to the cooling of the compressor into the housing element of the document.

The device according to the invention for the recycling of exhaust gas of an internal combustion engine in which the exhaust gas heat exchanger and the compressor are combined in a module comprises in sum various advantages.

A minimal number of parts and a minimal associated structural space, minimal weight with minimal costs for the manufacturing, assembly and maintenance, wherein the reduced use of material protects resources and a lesser weight that also reduces the weight of the motor vehicle and therefore reduces the mass to be moved, results in a saving of fuel and reduces the emission of carbon dioxide.

In particular, the use of aluminum as housing material makes possible production methods for the integration of complex constructions of the housing element of the compressor and of the compressor wheel.

The inner volume of the device is less than the comparable inner volume in the case of a separate construction of compressor and exhaust gas heat exchanger.

Improvement of the making available of measures for avoiding the formation of condensate in conjunction with the compressor wheel such as exhaust gas-heat exchanger bypass functions, the use of heating elements or the like.

Making various operating modes of the recycling of exhaust gas available in order to make the internal combustion engine more efficient, with lesser emissions and wherein a lesser emission of pollutants results, for example, in the elevation of the low-pressure rate of the exhaust gas in a gasoline engine from 19% up to 30% for the reduction of the fuel consumption by up to 5%.

BRIEF DESCRIPTION OF THE DRAWINGS

Other details, features and advantages of embodiments of the invention result from the following description of exemplary embodiments with reference made to the associated drawings. In the figures.

DETAILED DESCRIPTION OF EXEMPLARY EMBODIMENTS OF THE INVENTION

Figure 1:
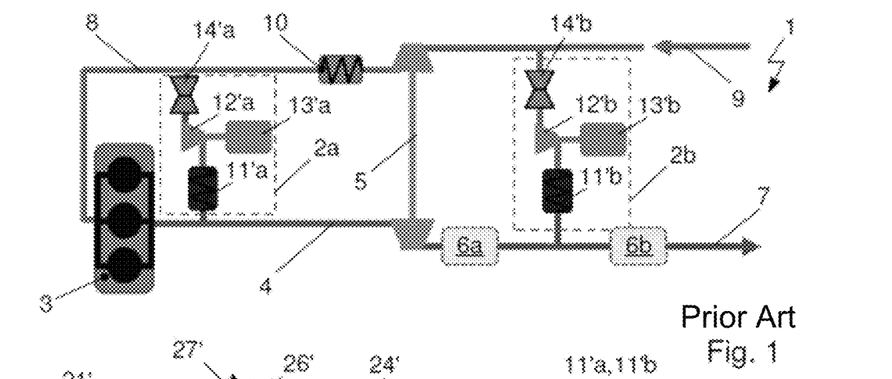
FIG. 1 shows a system for guiding the air of an internal combustion engine from the prior art.

FIG. 1 shows a system 1 for guiding air of an internal combustion engine 3 with arrangements 2a, 2b for recycling exhaust gas from the prior art.

The system 1 comprises a suction intake line 8 for drawing in combustion air for the internal combustion engine 3. Fresh air is drawn in from an environment through the suction intake line 8 via the compressor side of a turbocharger 5 in direction of flow 9. The compressed air is conducted via a loading air cooler 10 to the internal combustion engine 3 and distributed into individual cylinders. The exhaust gas generated during combustion is removed through the exhaust gas line 4 via the turbine side of the turbocharger 5. The turbine side and the compressor side of the turbocharger 5 are mechanically coupled, for example, by a shaft, so that the turbine drives the compressor and therefore the throughput of air is increased and the suction intake work of the pistons of the internal combustion engine 3 are reduced. Consequently, the turbocharger 5 draws the energy for compressing the drawn-in air from the residual pressure of the exhaust gases. The exhaust gas is conducted away into the environment in the direction of flow 7 of the exhaust gas after having passed the turbine side of the turbocharger 5 and devices 6*a*, 6*b* for the post-treatment of the exhaust gas.

The exhaust gas line 4 and the suction intake line 8 are connected to one another using fluid technology by arrangements 2*a*, 2*b* for the recycling of exhaust gas, wherein the first arrangement 2*a* for the recycling of exhaust gas can be operated in the high pressure range and the second arrangement 2*b* for the recycling of exhaust gas in the low pressure range.

The first arrangement 2*a* connects to the exhaust gas line 4 in the direction of flow 7 of the mass flow of the exhaust gas in front of the turbine side of the turbocharger 5 to the suction intake line 8 in the direction of flow 9 of the drawn-in mass flow of air after the charging air cooler 10 and therefore after the compressor side of the turbocharger 5. The second arrangement 2*b* connects to the exhaust gas line 4 in the direction of flow 7 of the mass flow of the exhaust gas after the turbine side of the turbocharger 5 to the suction intake line 8 in the direction of flow 9 of the drawn-in mass flow of air in front of the compressor side of the turbocharger 5.

The arrangements 2*a*, 2*b* are constructed of an exhaust gas heat exchanger 11'*a*, 11'*b* for cooling exhaust gas, a compressor 12'*a*, 12'*b* for transporting the mass flow of the exhaust gas, and a valve 14'*a*, 14'*b* for regulating the amount and with it the dosing of the recycled mass flow of the exhaust gas. The compressors 12'*a*, 12'*b* are mechanically coupled by a shaft to a drive 13'*a*, 13'*b*. The drives 13'*a*, 13'*b* are preferably constructed as electromotors.

Higher exhaust gas rates can be achieved with the arrangement 2*b* for the recycling of exhaust gas in the low-pressure range; however, the pressure gradient in the exhaust gas line 4 and the suction intake line 8 is slight so that additional components must be used to raise the pressure gradient. The arrangement 2*b* for the recycling of exhaust gas in the low-pressure range additionally makes possible the recycling of clean exhaust gas since the exhaust gas is removed in the direction of flow 7 to a device 6*a* for the post-treatment of the exhaust gas, for example, a particle filter in an internal combustion engine 3 operated with diesel fuel.

The arrangement 2*a* for the recycling of exhaust gas in a high pressure range has a distinctly higher dynamic but is limited as regards the achievable exhaust gas rates in order to ensure the supply of the turbine side of the turbocharger 5 with sufficient exhaust gas.

Figures 2, 3, 4:
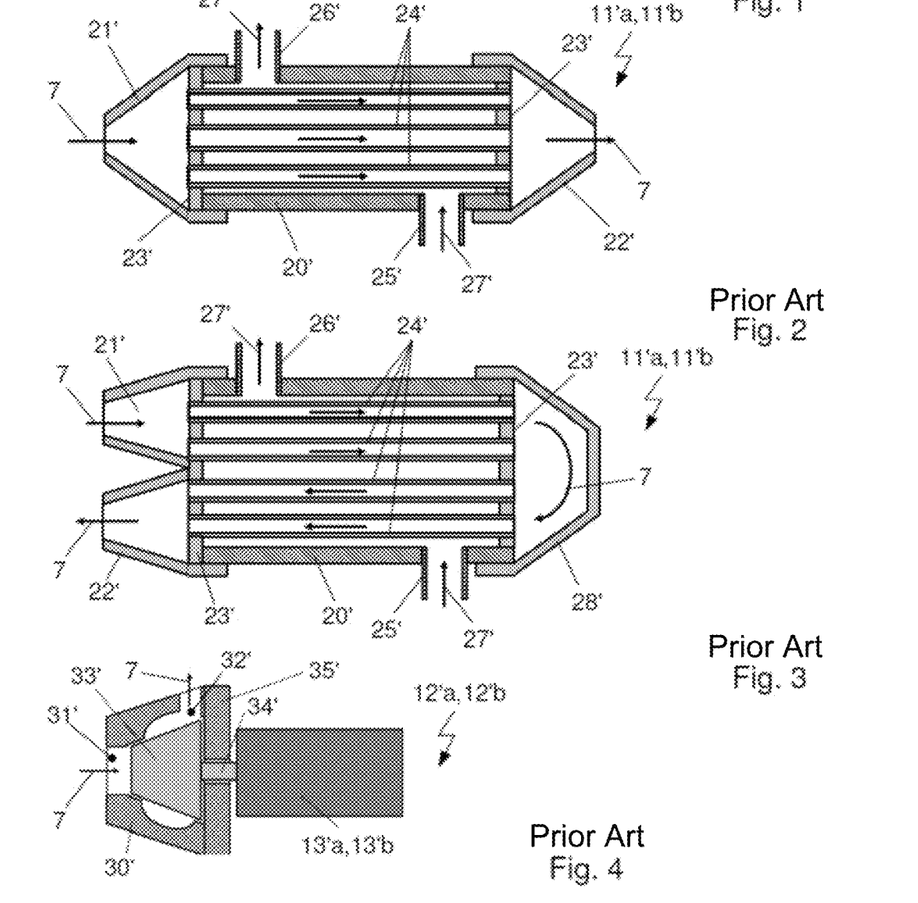
FIG. 2 shows an exhaust gas heat exchanger from the prior art through which exhaust gas flows in a single flute.
FIG. 3 shows an exhaust gas heat exchanger from the prior art through which exhaust gas flows in two flutes.
FIG. 4 shows a compressor for transporting a mass flow of the exhaust gas from the prior art.

FIG. 2 shows an exhaust gas heat exchanger 11'*a*, 11'*b* of an arrangement 2*a*, 2*b*, through which heat exchanger exhaust gas flows in a single flute for the recycling of exhaust gas from the prior art. The exhaust gas heat exchanger 11'*a*, 11'*b* serves in combination with the internal combustion engine 3 to cool the circulating exhaust gas.

The exhaust gas enters in the direction of flow 7 through an inlet 21' into the exhaust gas heat exchanger 11'*a*, 11'*b* and is distributed inside the inlet 21' constructed as an inlet funnel into individual conduits 24'. The tubes forming the conduits 24' are arranged held in carrier plates 23'. The carrier plates 23' therefore serve as tube bottoms. The exhaust gas flows in parallel and in a direction of flow 7 through the conduits 24', and therefore on the inside of the tubes. At the exit from the conduits 24' the exhaust gas is collected in an outlet 22' of the exhaust gas heat exchanger 11'*a*, 11'*b* and conducted out of the exhaust gas heat exchanger 11'*a*, 11'*b* through the outlet 22' constructed as an outlet funnel.

A coolant flows around the outside of the tubes forming the conduits 24'. The coolant flows in an intermediate space formed by a housing 20' and the tubes. The housing 20' surrounding the tubes and the intermediate space comprises an inlet 25' and an outlet 26' for the coolant that flows in the direction of flow 27' through the intermediate spaces. The intermediate spaces are limited by the housing 20', the tubes, and the carrier plates 23'.

FIG. 3 shows an exhaust gas heat exchanger 11'*a*, 11'*b* of an arrangement 2*a*, 2*b* for the recycling of exhaust gas from the prior art, through which heat exchanger an exhaust gas flows in two flutes. In distinction to the embodiment according to FIG. 2, the exhaust gas heat exchanger 11'*a*, 11'*b* is loaded in such a manner that the exhaust gas flows in parallel with the conduits 24', wherein the direction of flow of the exhaust gas inside the first flute is aligned opposite to the direction of flow inside the second flute. The conduits 24' are distributed in such a manner that the first number of conduits 24', that is, at least one conduit 24', forms a forward-running exhaust gas stretch of the first flute, whereas a second number of conduits 24', that is, once again at least one conduit 24', forms a backward-running exhaust gas stretch of the second flute.

The exhaust gas enters through an inlet 21' into the exhaust gas heat exchanger 11'*a*, 11'*b*, is distributed onto the first conduits 24' and flows in parallel and in a direction of flow 7 through the first conduits 24'. The exhaust gas is collected at the outlet of the first conduits 24' in a deflection element 28', reversed in the direction of flow 7, and distributed onto the second conduits 24'. The exhaust gas now flows through the second conduits 24' in parallel and in a direction of flow counter to the direction of flow 7 through the second conduits 24'. At the exit from the second conduits 24' the exhaust gas is collected in an outlet 22' of the exhaust gas heat exchanger 11'*a*, 11'*b* and conducted out of the exhaust gas heat exchanger 11'*a*, 11'*b*. The tubes forming the conduits 24' are also held in carrier plates 23'.

The coolant-side construction of the exhaust gas heat exchanger 11'*a*, 11'*b* corresponds to the embodiment described in FIG. 2.

The exhaust gas heat exchangers 11'*a*, 11'*b* therefore have zero, one, or several reversals of the direction of flow 7 of the mass flow of the exhaust gas. An exhaust gas heat exchanger 11'*a*, 11'*b* that has no reversal of the direction of flow 7 of the mass flow of the exhaust gas according to FIG. 2 is also designated as an I-flowthrough heat exchanger. An exhaust gas heat exchanger 11'*a*, 11'*b* with one reversal of the direction of flow 7 of the mass flow of the exhaust gas according to FIG. 3 is designated as a U-flowthrough heat exchanger. Exhaust gas heat exchangers 11'*a*, 11'*b*, that are not shown, with several reversals of the direction of flow 7 of the mass flow of the exhaust gas are designated as an S-flowthrough, a W-flowthrough, or multiply as a function of the number of reversals and the arrangement of the conduits.

FIG. 4 shows a compressor 12'a, 12'b from the prior art constructed as a radial compressor for transporting a mass flow of the exhaust gas, also designated as a pump. The compressor 12'a, 12'b comprises a housing constructed as a spiral housing 30' with an inlet 31' and an outlet 32' for the exhaust gas. A driven compressor wheel 33' for transporting the exhaust gas is arranged inside the housing 30'. The compressor wheel 33' is mechanically coupled by a drive shaft 34' to a drive 13'a, 13'b that is preferably constructed as an electrical motor. The compressor wheel 33' and the driveshaft 34' are arranged held by a bearing element 35'.

The housing 30' is closed tightly against the exhaust gas by the bearing element 35' in the direction of the drive 13'a, 13'b. The drive shaft 34' extends from the outside through the bearing element 35' into the housing 30'.

The exhaust gas flows in the direction of flow 7 through the inlet 31' into the housing 30' and axially into the compressor wheel 33' operated as an impeller. As a consequence of the movement of the compressor wheel 33' the energy necessary for raising the pressure is supplied to the exhaust gas and the exhaust gas is defected radially outward. The direction of flow 7 of the exhaust gas experiences a change here from the axial direction into the radial direction of approximately 90°.

Figure 5:
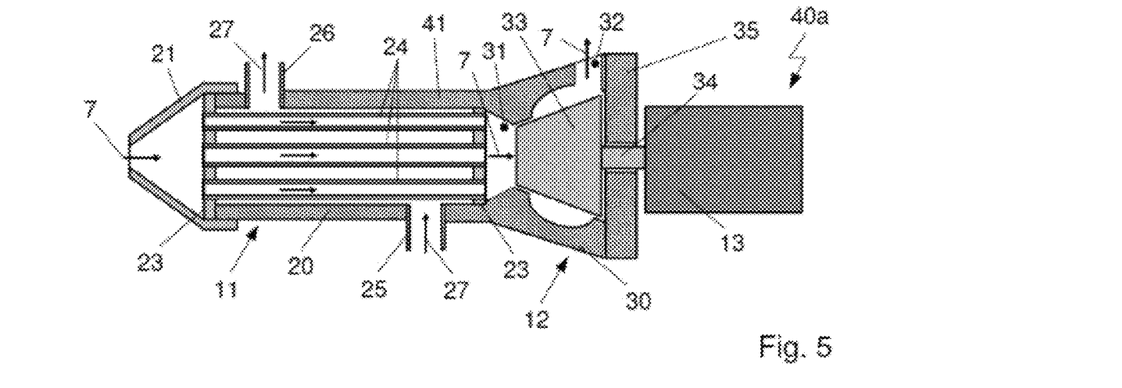
FIG. 5 shows a device with an exhaust gas heat exchanger with integrated compressor through which heat exchanger exhaust gas flows in a single flute.

FIG. 5 shows a device 40a for the recycling of exhaust gas as an exhaust gas heat exchanger 11 with an integrated compressor 12, through which exhaust gas heat exchanger exhaust gas flows in a single flute. The device 40a is a combination of an exhaust gas heat exchanger 11 through which exhaust gas flows and with a compressor 12 designed as a radial compressor for transporting the mass flow of the exhaust gas.

The exhaust gas heat exchanger 11 and the compressor 12 are arranged inside a common housing 41 comprising two housing elements 20, 30. The first housing element 20 surrounds the tubes of the exhaust gas heat exchanger 11 which form the conduits 24 whereas the compressor wheel 33 of the compressor 12 is arranged inside the second housing element 30.

The housing element 20 of the exhaust gas heat exchanger 11 and the housing element 30 of the compressor 12 are constructed united as housing 41 and therefore as one component. The housing 41 is constructed from the housing elements 20, 30 either as a one-piece component or as a connected component in such a manner that the housing 41 forms a unit. A one-piece component denotes that the housing 41 consists of one material and is manufactured without additional connection spots. The housing 41 joined together to a connected component from the housing elements 20, 30 also forms a unit tight against exhaust gas, wherein the individual housing elements 20, 30 are connected to one another with both having the same substance, for example by soldering or welding, or positively or non-positively, for example, by screws, clips or by crimping.

The exhaust gas flows in the direction of flow 7 through the inlet 21 into the housing element 20 of the exhaust gas heat exchanger 11 and is distributed inside the inlet 21 constructed as an inlet funnel onto the tubes forming individual conduits 24. The tubes are arranged fastened in carrier plates 23 that are constructed as tube bottoms. The exhaust gas flowing in parallel and in a direction of flow 7 through the conduits 24 and therefore on the inside of the tubes is collected at the exit of the conduits 24 in an outlet and conducted through the outlet formed as an outlet funnel out of the exhaust gas heat exchanger 11 directly into the compressor 12. The outlet of the housing element 20 of the exhaust gas heat exchanger 11 is at the same time the inlet 31 of the housing element 30 of the compressor 12.

The direct transfer of the exhaust gas from the exhaust gas heat exchanger 11 into the compressor 12 means that no other additional and individual or separated components of an exhaust gas stretch are provided or necessary between the exhaust gas heat exchanger 11 and the compressor 12, for example, devices for conducting, such as tubes, hoses, deflection elements, or the like.

The exhaust gas inside the housing 41 flows out of the housing element 20 of the exhaust gas heat exchanger 11 and into the housing element 30 of the compressor 12. The housing element 30 of the compressor is constructed as a spiral housing, and therefore the flow between the housing elements 20, 30 is conducted to the compressor wheel 33 arranged in the housing element 30. The driven compressor wheel 33 for transporting the exhaust gas is mechanically coupled via the drive shaft 34 to the drive 13, which is preferably constructed as an electromotor. The drive shaft 34 and the compressor wheel 33 are firmly and rigidly connected to the drive shaft 34 and are arranged supported by the bearing element 35 in such a manner that they can rotate around an axis of rotation in the housing element 30 of the housing 41. The axis of rotation runs in the direction of the drive shaft 34. In addition, the housing 41 is closed tightly against exhaust gas in the direction of the drive 13 with the aid of the bearing element 35, wherein the drive shaft 34 is run through the bearing element 35.

The exhaust gas flows in the direction of flow 7 through the inlet 31 into the housing element 30 of the compressor 12, which housing element is constructed as a spiral housing, and meets the compressor wheel 33 operated as an impeller wheel in an axial direction. When passing the compressor wheel 33 the pressure of the exhaust gas is increased and the exhaust gas is conducted radially outward. The exhaust gas is subsequently conducted through the outlet 32 out of the housing 41.

A valve that is not shown is associated with the device 40a as a partial component of an arrangement for recycling the exhaust gas. The valve is arranged in the direction of flow of the exhaust gas alternatively in front of or after the device 40a. The valve (not shown) serves to regulate the amount and therefore the dosing of the recycled mass flow of the exhaust gas.

The tubes of the exhaust gas heat exchanger 11 are loaded on the outside by coolant, wherein the coolant is conducted in the direction of flow 27 through an intermediate space formed by the housing 41 and the tubes. The intermediate space is surrounded by the housing 41, the conduits 24, and the carrier plates 23 of the conduits 24. The housing 41 surrounding the conduits 24 and the intermediate space comprises an inlet 25 and an outlet 26 for the coolant that are arranged in such a manner that the coolant and the exhaust gas substantially flow toward one another in a crossed countercurrent.

Figure 6:
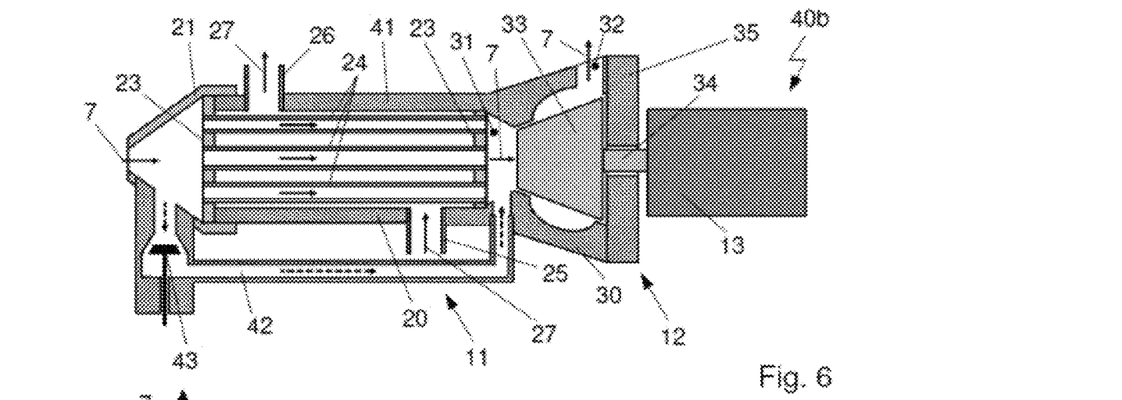
FIG. 6 shows a device with an exhaust gas heat exchanger with integrated compressor and bypass conduit for the mass flow of the exhaust gas through which heat exchanger exhaust gas flows in a single flute.

FIG. 6 shows a device 40b for recycling exhaust gas as an exhaust gas heat exchanger 11 through which exhaust gas flows in a single flute. The device 40b is provided with an integrated compressor 12 and a bypass conduit 42 for the mass flow of the exhaust gas. The device 40b corresponds substantially to the embodiment of the device 40a according to FIG. 5 with an additional bypass conduit 42 and a bypass valve 43.

The bypass conduit 42 extends from the inlet 21 of the housing element 20 to the outlet of the exhaust gas out of the exhaust gas heat exchanger 11, which is also the inlet 31 of the exhaust gas into the compressor 12. The bypass conduit 42 branches from the inlet funnel to the distribution of the mass flow of the exhaust gas onto the individual conduits 24 and empties at the transition area of the housing elements 20, 30. Consequently, the bypass conduit 42 separates at least a part of the mass flow of the exhaust gas that is then conducted around the exhaust gas heat exchanger 11 and therefore does not experience any thermal transfer with the coolant. The mass flow of the exhaust gas conducted through the bypass conduit 42 is therefore not cooled down and is conducted directly to the compressor 12. Depending on the distribution of the mass flow of the exhaust gas into a component flowing through the bypass conduit 42 and into a component flowing through the exhaust gas heat exchanger 11, both components are re-mixed at the inlet 31 of the exhaust gas into the compressor 12.

The bypass conduit 42 includes a bypass valve 43 in the area of the branching of the bypass conduit 42 from the inlet 21, for opening and closing the bypass conduit 42. According to alternative embodiments that are not shown the bypass valve can be arranged in a closable manner at any location of the bypass conduit.

The amount and the dosing of the mass flow of the exhaust gas conducted around the exhaust gas heat exchanger 11, and therefore the ratio of the components of the mass flows through the exhaust gas heat exchanger 11 and through the bypass conduit 42, are adjusted by the degree of opening of the bypass valve 43.

The FIG. 7 to 10 respectively show a device 40c, 40d, 40e, 40f for recycling exhaust gas as an exhaust gas heat exchanger 11 through which exhaust gas flows in two flutes. The devices 40c, 40d, 40e, 40f further include an integrated compressor 12 and optionally constructed bypass conduits 47, 49 for at least one part of the mass flow of the exhaust gas. The devices 40c, 40d, 40e, 40f are again a combination of an exhaust gas heat exchanger 11 through which exhaust gas flows with a compressor 12 constructed as a radial compressor for transporting the mass flow of the exhaust gas.

The exhaust gas heat exchanger 11 and the compressor 12 are arranged in a common housing 41 comprising two housing elements 20, 30, wherein the first housing element 20 encloses the conduits 24 of the exhaust gas heat exchanger 11, and the second housing element 30 encloses the compression wheel 33 of the compressor 12.

The exhaust gas flows through the inlet 21 into the housing element 20 of the exhaust gas heat exchanger 11 and is distributed into the individual conduits 24 arranged as tubes fastened in carrier plates 23. The exhaust gas heat exchanger 11 is loaded by the exhaust gas in such a manner that the exhaust gas flows in parallel through the conduits 24, wherein the direction of flow of the exhaust gas is aligned inside the first flute opposite to the direction of flow inside the second flute. A first number of conduits 24, that is, at least one conduit 24, forms a forward-running exhaust gas stretch as the first flute whereas a second number of conduits 24, that is also at least one conduit 24, forms a backward-running gas stretch as the second flute.

The exhaust gas flowing through the conduits 24, and therefore inside of the tubes, is collected at the exit of the first conduits 24 and directly introduced into the housing element 30 of the compressor 12, which housing element is constructed as a spiral housing. The exit of the first conduits 24 of the exhaust gas heat exchanger 11 is at the same time the inlet 31 of the housing element 30 to the compressor wheel 33 of the compressor 12. Therefore, the exhaust gas flowing within the housing elements 20, 30 is supplied to the compressor wheel 33 arranged in the housing element 30. The compressor wheel 33 is, as in the previous embodiments, driven by the drive shaft 34 and is mechanically connected to the drive 13, and the drive shaft 34 is arranged supported in such a manner that it can rotate about an axis of rotation by the bearing element 35 in the housing element 30 of the housing 41.

The exhaust gas flows in the direction of flow 7 through the inlet 31 into the housing element 30 of the compressor 12, which is constructed as a spiral housing. The exhaust gas then flows in the axial direction into the compressor wheel 33, is conducted radially outward, and removed through the outlet 32 into an exhaust conduit 44. The exhaust conduit 44 is constructed inside the housing element 30.

While it is flowing through the compressor 12 and the exhaust gas conduit 44, the direction of flow 7 of the exhaust gas is reversed relative to the direction of flow inside the forward-running exhaust gas stretch. The exhaust gas is distributed into the second conduits 24. The exhaust gas now flows in parallel and in the direction of flow 7 opposite the forward-running exhaust gas stretch, through the second conduits 24 of the backward-running exhaust gas stretch. At the exit from the second conduits 24, the exhaust gas is collected in an outlet 22 of the exhaust gas heat exchanger 11 and conducted out of the exhaust gas heat exchanger 11.

In comparison to the embodiment according to FIG. 3, the deflection element 28' of the exhaust gas heat exchanger 11'a, 11'b, which brings about a deflection of the direction of flow 7 of the exhaust gas through 180°, is replaced by the compressor 12 with the housing element 30. The housing element 30 of the compressor 12 now brings about the deflection of the direction of flow 7 of the exhaust gas through 180°.

Figure 7:
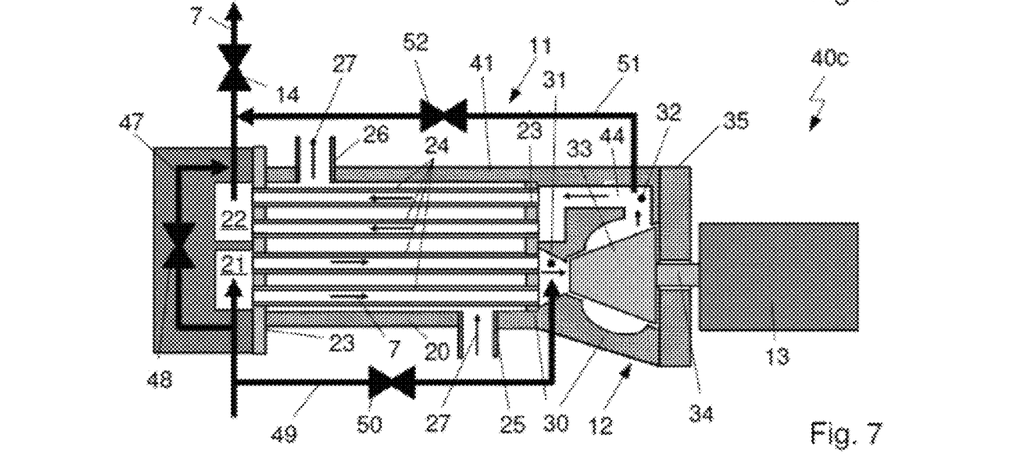
FIG. 7 shows a device with an exhaust gas heat exchanger with integrated compressor and optionally constructed bypasses through which heat exchanger exhaust gas flows in two flutes.
Figure 8:
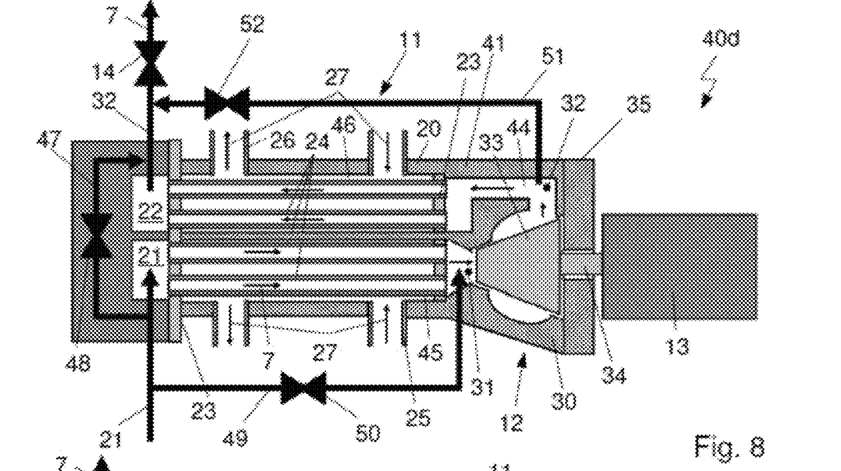
FIG. 8 shows a device with an exhaust gas heat exchanger with integrated compressor and optionally constructed bypasses and a two-stage cooling through which heat exchanger exhaust gas flows in two flutes.

The tubes forming the conduits 24 are arranged in such a manner in combination with the construction of the housing 41, especially of the housing element 30 of the compressor 12, that the conduits 24 of the forward-running exhaust gas stretch are combined in an area separate from the conduits 24 of the backward-running exhaust gas stretch in another area. The areas of the conduits 24 of the forward-running exhaust gas stretch and of the backward-running exhaust gas stretch of the devices 40c, 40d, according to the FIGS. 7 and 8, are arranged adjacent to each other. In particular, the areas are arranged above or below, and therefore separated from each other.

Figure 9:
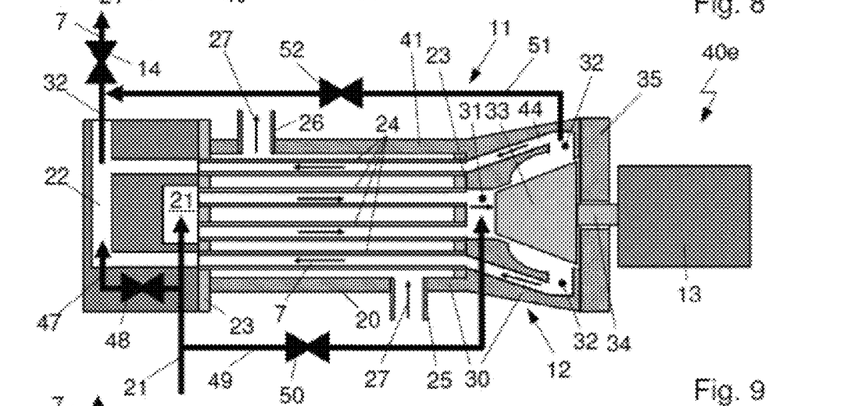
FIG. 9 shows a device with an exhaust gas heat exchanger in a symmetric arrangement with integrated compressor and optionally constructed bypasses through which heat exchanger exhaust gas flows in two flutes.
Figure 10:
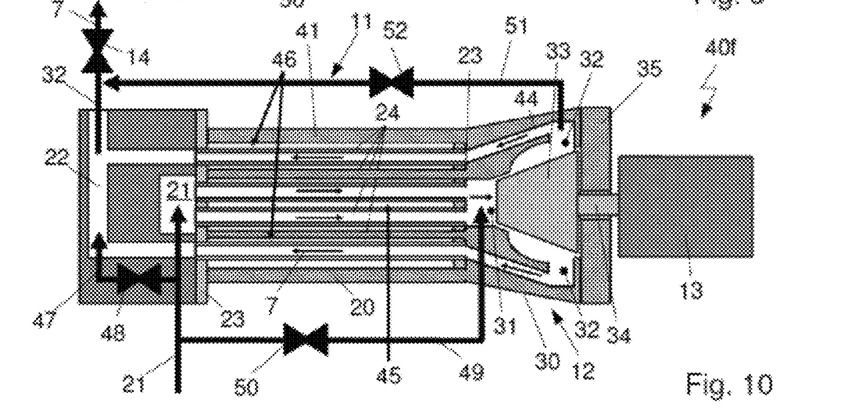
FIG. 10 shows a device with an exhaust gas heat exchanger in a symmetric arrangement with integrated compressor and optionally constructed bypasses and a two-stage cooling through which heat exchanger exhaust gas flows in two flutes.

The housing element 30 of the compressor 12 of the devices 40e, 40f according to the FIGS. 9 and 10 is constructed in such a manner, in comparison to the devices 40c, 40d, that the areas of the conduits 24 of the forward-running and of the backward-running exhaust gas stretches are arranged symmetrically, so that the housing elements 20, 30 of the exhaust gas heat exchanger 11 and of the compressor 12 can be designed substantially symmetrically. The conduits 24 of the forward-running exhaust gas stretch are in a central area of the exhaust gas heat exchanger 11, and the conduits 24 of the backward-running exhaust gas stretch are concentrically arranged around the conduits 24 of the forward-running exhaust gas stretch. The conduits 24 of the backward-running exhaust gas stretch are arranged, in their totality, coaxially around the conduits 24 of the forward-running exhaust gas stretch.

The cooling-side construction of the exhaust gas heat exchanger 11 of the device 40c according to FIG. 7, and of the device 40e according to FIG. 9, corresponds to the embodiment described in FIG. 3.

The coolant sides of the exhaust gas heat exchanger 11 of the device 40d according to FIG. 8, and of the device 40f according to FIG. 10, are constructed for a two-stage cooling of the exhaust gas. The conduits 24 of the forward-running exhaust gas stretch and of the backward-running exhaust gas stretch are surrounded by separate housing parts configured to conduct a coolant. The tubes of the forward-running exhaust gas stretch that form the conduits 24 are surrounded by a volume 45 for a first cooling circuit and the tubes of the retrograde-running exhaust gas stretch that form the conduits 24 are surrounded by a volume 46 for a second cooling circuit that are formed by the housing parts conducting coolant.

In the embodiments of the devices 40c, 40d shown in FIGS. 7 and 8, the housing parts conducting coolant and surrounding volumes 45, 46 for the coolant circuits of the forward-running exhaust gas stretch and of the backward-running exhaust gas stretch, are arranged adjacent to one another, in particular above or below one another.

In the embodiments of the devices 40e, 40f shown in FIGS. 9 and 10, the housing parts conducting coolant and surrounding the volumes 45, 46 for the coolant circuits of the forward-running exhaust gas stretch and of the backward-running exhaust gas stretch are arranged concentrically to one another, in particular coaxially to one another corresponding to the associated tubes.

The devices 40c, 40d, 40e, 40f can additionally be constructed with different bypass conduits 47, 49, 51 and associated bypass valves 48, 50, 52 for the mass flow of the exhaust gas.

A first bypass conduit 47 extends from the inlet 21 into the housing element 20 and into the exhaust gas heat exchanger 11 to the outlet of the exhaust gas from the exhaust gas heat exchanger 11. The bypass conduit 47 for the distribution of the mass flow of the exhaust gas is configured to conduct at least a part of the mass flow of the exhaust gas around the exhaust gas heat exchanger 11 and the compressor 12, wherein no heat is transferred between the mass flow of the exhaust gas conducted through the bypass conduit 47 and the coolant. The mass flow of the exhaust gas conducted through the bypass conduit 47 is consequently neither cooled down nor compressed.

Depending on the distribution of the mass flow of the exhaust gas into a component flowing through the bypass conduit 47 and into a component flowing through the exhaust gas heat exchanger 11 and the compressor 12, both components are re-mixed at the outlet 22 of the exhaust gas heat exchanger 11. The dosing of the mass flow of the exhaust gas conducted around the exhaust gas heat exchanger 11, and with it, the ratio of the components of the mass flows of the exhaust gas heat exchanger 11 and the bypass conduit 47 is adjusted with the degree of opening of the bypass valve 48 constructed in the bypass conduit 47.

A second bypass conduit 49 extends from the inlet 21 of the housing element 20 to the inlet 31 of the compressor 12 and empties at the transitional area of the housing elements 20, 30. Therefore, the bypass conduit 49 is constructed for separating at least a part of the mass flow of the exhaust gas that is conducted around the first conduits 24 of the forward-running exhaust gas stretch of the exhaust gas heat exchanger 11. As a result, no heat is transferred to the coolant by the mass flow of the exhaust gas conducted through the bypass conduit 49, at least in the area of the forward-running exhaust gas stretch, such as the first flute of the double-fluted exhaust gas heat exchanger 11. Consequently, the mass flow of the exhaust gas conducted through the second bypass conduit 49 is not cooled down and is conducted directly to the compressor 12. Depending on the distribution of the mass flow of the exhaust gas into a component flowing through the bypass conduit 49 and into a component flowing through the first conduits 24 of the exhaust gas heat exchanger 11, both components are re-mixed at the inlet 31 of the exhaust gas into the compressor 12.

The bypass conduit 49 is constructed with a bypass valve 50 for opening and closing the bypass conduit 49. The amount of the mass flow of the exhaust gas conducted around the first flute of the exhaust gas heat exchanger 11, and therefore, the ratio of the component of the mass flows, is adjusted by the first flute and by the bypass conduit 49 via the degree of opening of the bypass valve 50.

A third bypass conduit 51 extends from the outlet 32 of the compressor 12 and from the exhaust gas conduit 44 of the housing element 30 to the outlet 22 of the housing element 20 of the exhaust gas heat exchanger 11. The bypass conduit 51 is therefore constructed for separating at least a part of the mass flow of the exhaust gas to be conducted around the second conduits 24 of the backward-running exhaust gas stretch of the exhaust gas heat exchanger 11. As a result, no heat is transferred to the coolant by the mass flow of the exhaust gas conducted through the bypass conduit 51, at least in the area of the backward-running exhaust gas stretch of the second flute of the two-flute exhaust gas heat exchanger 11. Consequently, the mass flow of the exhaust gas conducted through the third bypass conduit 51 is not cooled down and is directly conducted to the outlet 22 of the exhaust gas heat exchanger 11. As a result of the distribution of the mass flow of the exhaust gas into a component flowing through the bypass conduit 51 and a component flowing through the second conduits 24 of the exhaust gas heat exchanger 11, both components are re-mixed at the outlet 22.

The bypass conduit 51 comprises a bypass valve 52 for opening and closing the bypass conduit 51. The amount of the mass flow of the exhaust gas conducted around the second flute of the exhaust gas heat exchanger 11, and therefore, the ratio of the components of the mass flows through the second flute and through the bypass conduit 51 are adjusted by the degree of opening of the bypass valve 52.

The bypass conduits 47, 49, 51 can be constructed alone and/or in combination with one or both of the particular other bypass conduits 47, 49, 51. The device 40c, 40d, 40e, 40f can be operated in different modes.

If, for example only the bypass conduit 47 is constructed around the device 40c, 40d, 40e, 40f, and therefore, around the heat exchanger 11 and the compressor 12, or if the bypass conduits 49, 51 each around one flute of the heat exchanger 11 are closed, and therefore are not active, the exhaust gas is conducted around the compressor 12 and no exhaust gas flows through the compressor 12. Consequently, the exhaust gas is neither cooled nor compressed. The bypass conduit 47 is also designated as a direct bypass.

If one of the two bypass conduits 49, 51 is constructed or is active around a flute of the heat exchanger 11, the mass flow of the exhaust gas conducted through the device 40c, 40d, 40e, 40f is cooled either when flowing through the forward-running exhaust gas stretch or the backward-running exhaust gas stretch. In addition, the mass flow of the exhaust gas is conducted through the compressor 12 and compressed. The bypass conduit 47 around the device 40c, 40d, 40e, 40f can be constructed to be open or closed.

If both bypass conduits 49, 51 are constructed or are active around a flute of the heat exchanger 11, the mass flow of the exhaust gas conducted through the device 40c, 40d, 40e, 40f is conducted around each of the forward-running exhaust gas stretch and backward-running the exhaust gas stretch, and through the compressor 12. The mass flow of the exhaust gas conducted through the bypass conduits 49, 51 is compressed, but not cooled. The bypass conduit 47 around the device 40c, 40d, 40e, 40f can be constructed to be open or closed.

The bypass conduits 47, 49, 51 can be constructed directly in the housing 41 of the device 40c, 40d, 40e, 40f so that no separate and additional tubes and carrier plates need to be provided.

The second bypass conduit 49 and the third bypass conduit 51 can be surrounded on the outside with coolant according to an alternative embodiment that is not shown. According to another alternative embodiment that is not shown, the bypass conduits 49, 51 have no bypass valves.

Furthermore, the housing 41 with the housing elements 20, 30 is constructed with additional cooling conduits that are connected by fluid technology to the volume of the exhaust gas heat exchanger 11 loaded by the coolant, particularly the inside of the housing element 30. In addition to the exhaust gas, even the compressor 12 can be cooled by the coolant conducted through the additional cooling conduits in order to protect the components of the compressor 12 from overheating. The compression of the exhaust gas can result in very high temperatures.

A valve 14 for regulating the amount, and therefore, the dosing of the recycled mass flow of the exhaust gas, is arranged after the devices 40c, 40d, 40e, 40f as a partial component of an arrangement for recycling the exhaust gas in the direction of flow 7 of the exhaust gas. Alternatively, the valve can also be arranged in the direction of flow of the exhaust gas even in front of the devices 40c, 40d, 40e, 40f.

Figure 11:
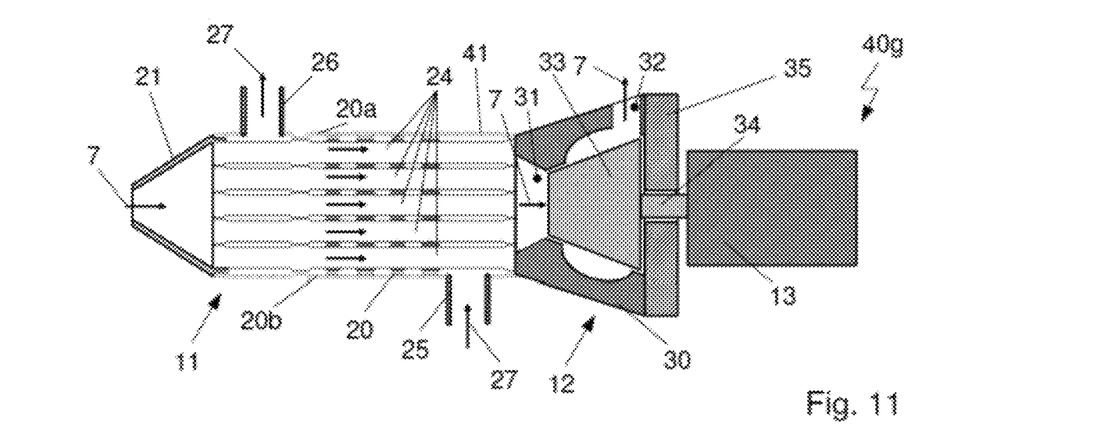
FIG. 11 shows a device with an exhaust gas heat exchanger with integrated compressor from a divided housing element of the exhaust gas heat exchanger through which heat exchanger exhaust gas flows in a single flute.

FIG. 11 shows a device 40g with an exhaust gas heat exchanger 11 with integrated compressor 12 that are arranged inside the common housing 41, wherein the heat exchanger 11 is flowed through with a single flute. The exhaust gas heat exchanger 11 comprises a divided housing element 20 constructed with a first part 20a as the upper half and a second part 20b as the lower half.

The individual parts 20a, 20b of the housing element 20 as well as the housing elements 20, 30 consist of the same substance and are connected to each other, for example, by soldering or welding, or are positively or non-positively connected to each other, for example, by screwing, clipping or crimping. The parts 20a, 20b of the housing element 20 of the exhaust gas heat exchanger 11 and the housing element 30 of the compressor 12 are constructed in a connected manner as housing 41 and therefore as one component.

The exhaust gas flowing in the direction of flow 7 through the inlet 21 into the housing element 20 is distributed inside the inlet 21 onto the individual conduits 24, as is also apparent from the embodiment according to FIG. 5. For further details refer in particular to the explanations for FIG. 5.

In distinction to the embodiment according to FIG. 5 the conduits 24 are constructed for conducting the exhaust gas between a first plate element and a second plate element. Elements for surface enlargement such as corrugated ribs or ribs with similar geometries are arranged on the exhaust gas side between both plate elements. The plate elements forming the conduits 24 are stacked above each other, wherein a second plate element rests on a first plate element, and an intermediate space for the coolant is formed between the plate elements as an upper and a lower limitation. At the ends of the conduits 24, the plate elements are constructed so as to widen the cross section of flow of the conduits 24 in such a manner that the intermediate space between the plate elements is sealed against the exhaust gas. The coolant is conducted in the direction of flow 27 through the intermediate space formed by the housing 41 and the plate elements.

LIST OF REFERENCE NUMERALS

1 System for conducting air
2a, 2b Arrangement for the recycling of exhaust gas
3 Internal combustion engine
4 Exhaust gas line
5 Turbocharger
6a, 6b Device for the post-treatment of the exhaust gas
7 Direction of flow of the mass flow of the exhaust gas
8 Suction intake line
9 Direction of flow of the drawn-in air mass flow
10 Charging air cooler
11, 11'a, 11'b exhaust gas heat exchanger
12, 12'a, 12'b Compressor
13, 13'a, 13'b Drive
14, 14'a, 14'b Valve
20 Housing element exhaust gas heat exchanger 11
20a First part housing element 20
20b Second part housing element 20
20' Housing exhaust gas heat exchanger 11'a, 11'b
21, 21' Exhaust gas inlet exhaust gas heat exchanger 11, 11'a, 11'b
22, 22' Exhaust gas outlet exhaust gas heat exchanger 11, 11'a, 11'b
23, 23' Carrier plate
24, 24' Conduit mass flow of the exhaust gas
25, 25' Inlet coolant
26, 26' Outlet coolant
27, 27' Direction of flow coolant mass flow
28' Deflection element
30 Housing element compressor 12
30' Housing compressor 12'a, 12'b
31, 31' Inlet exhaust gas compressor 12, 12'a, 12'b
32, 32' Outlet exhaust gas compressor 12, 12'a, 12'b
33, 33' Compressor wheel
34, 34' Drive shaft
35, 35' Bearing element
40a, 40b, 40c, 40d, 40e, 40f, 40g Device for the recycling of exhaust gas
41 Housing of the device
42 bypass conduit around heat exchanger 11
43 Bypass valve bypass conduit 42
44 Exhaust gas conduit
45 Volume first coolant circuit
46 Volume second coolant circuit
47 Bypass conduit around device 40c, 40d, 40e, 40f
48 Bypass valve bypass conduit 47
49, 51 bypass conduit around a flute of the heat exchanger 11
50, 52 Bypass valve bypass conduit 49, 51

The invention claimed is:

1. A device for the recycling of an exhaust gas of an internal combustion engine in a motor vehicle, comprising:
an exhaust gas heat exchanger having a first housing element with a first inlet, a first outlet, a second inlet, and a second outlet; and
a compressor having a second housing element with a compressor inlet and a compressor outlet, the first housing element of the exhaust gas heat exchanger and the second housing element of the compressor produced as a unitary housing, the exhaust gas heat exchanger and the compressor arranged inside the unitary housing, wherein the exhaust gas heat exchanger further comprises conduits allowing heat exchange between the exhaust gas passing through the conduits and a coolant passing over the conduits, at least a part of the conduits extending from the first inlet of the exhaust gas heat exchanger to the compressor inlet, wherein the exhaust gas discharged from the conduits is directly conducted into the compressor.

2. The device according to claim 1, wherein the unitary housing is produced with the first housing element and the second housing element as a one-piece component consisting of a single material.

3. The device according to claim 1, wherein the compressor is arranged in a direction of flow of an exhaust gas after the exhaust gas heat exchanger.

4. The device according to claim 3, wherein the compressor is a radial compressor with a compressor wheel, the compressor wheel arranged inside the second housing element and mechanically coupled to a drive by a drive shaft, and wherein the drive shaft extends through a bearing element into the second housing element and is supported to rotate about an axis of rotation.

5. The device according to claim 4, wherein a first bypass conduit extends from the first inlet into the unitary housing to the first outlet out of the unitary housing, wherein at least a part of a mass flow of the exhaust gas can be bypassed around the exhaust gas heat exchanger and the compressor.

6. The device according to claim 5, wherein a second bypass conduit extends from the first inlet into the unitary housing to the inlet of the compressor, wherein at least a part of the mass flow of the exhaust gas can be bypassed around at least a partial area of the exhaust gas heat exchanger.

7. The device according to claim 6, wherein a third bypass conduit extends from the outlet of the compressor to the first outlet of the first housing element, wherein at least a part of the mass flow of the exhaust gas can be bypassed around at least a partial area of the exhaust gas heat exchanger.

8. The device according to claim 7, wherein at least one of the first bypass conduit, the second bypass conduit, and the third bypass conduit includes a bypass valve configured to adjust an amount of the mass flow of the exhaust gas through the at least one of the first bypass conduit, the second bypass conduit, and the third bypass conduit.

9. The device according to claim 8, wherein the unitary housing further comprises cooling conduits in fluid communication with the exhaust gas heat exchanger, the cooling conduits charged with a coolant and extending into the second housing element of the compressor to cool the compressor.

10. The device according to claim 1, wherein the exhaust gas heat exchanger is multi-fluted, and wherein the compressor is arranged intermediate a pair of flutes of the exhaust gas heat exchanger.

11. The device according to claim 7, wherein the exhaust gas heat exchanger includes first conduits and second conduits, the first conduits providing fluid communication between the first inlet of the unitary housing and the compressor inlet, the second conduits providing fluid communication between the compressor outlet and the first outlet of the unitary housing.

* * * * *